Jan. 11, 1955  J. L. MacDONALD  2,699,031
FORAGE FEEDING AND PACKING MECHANISM
Filed Sept. 16, 1953  3 Sheets-Sheet 3

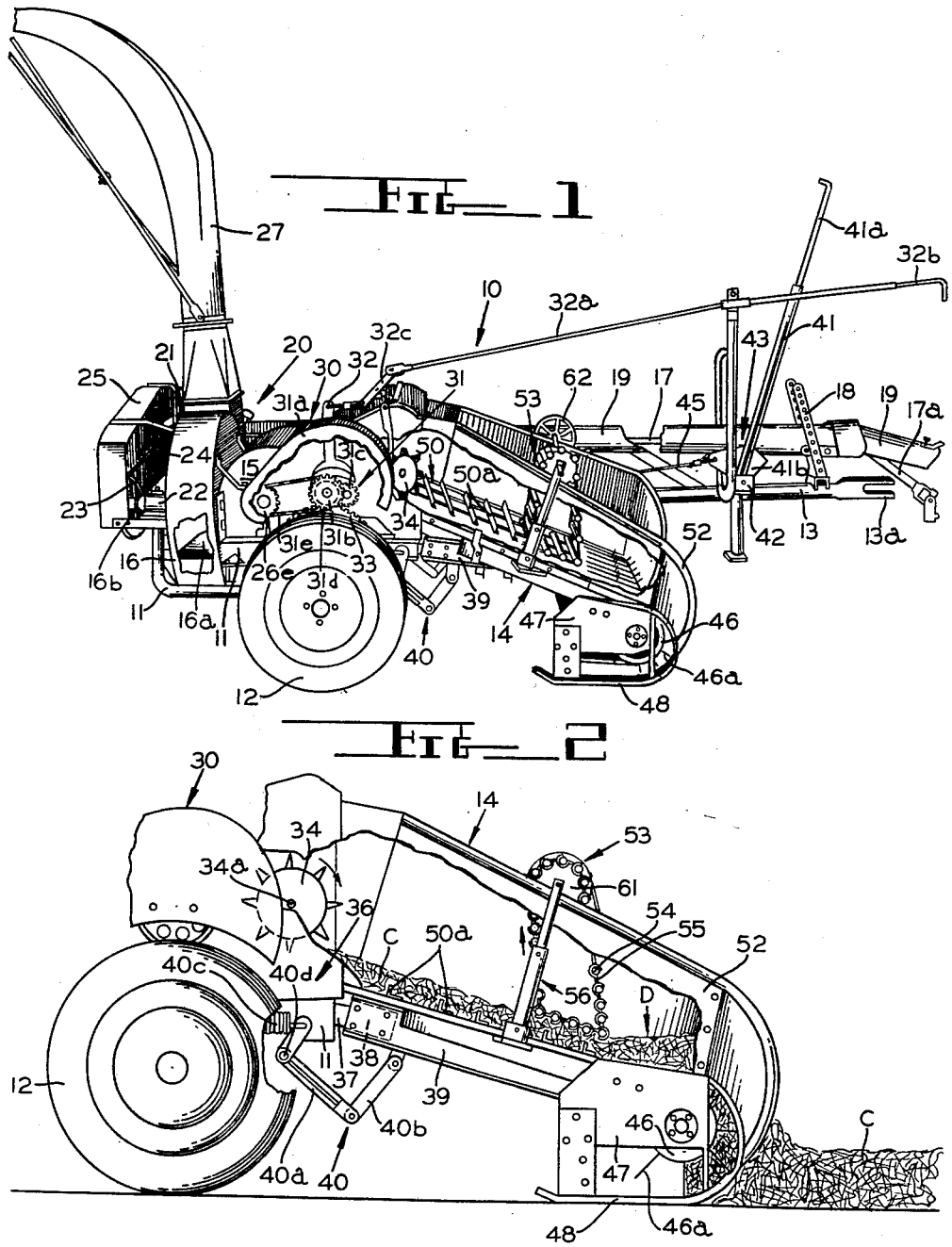

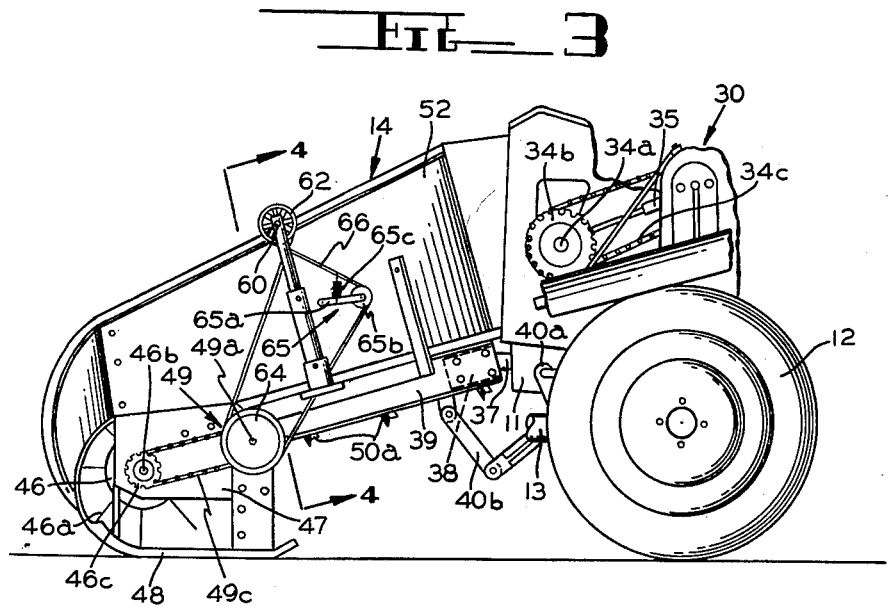
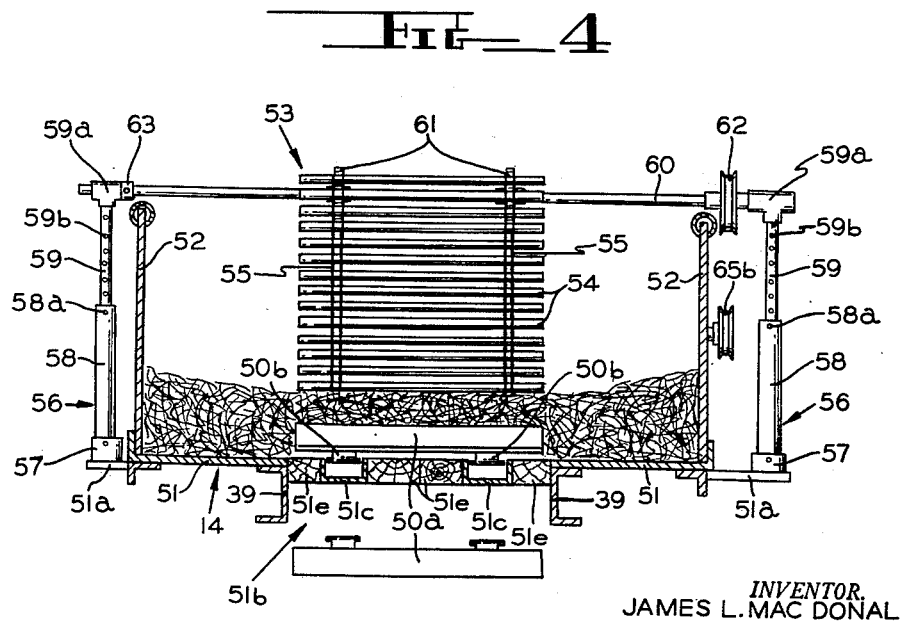

INVENTOR.
JAMES L. MACDONALD
BY E. C. McRae
J. R. Faulkner
W. A. Schaich
ATTORNEYS

United States Patent Office 2,699,031
Patented Jan. 11, 1955

2,699,031

FORAGE FEEDING AND PACKING MECHANISM

James L. MacDonald, Pontiac, Mich., assignor to Ford Motor Company, Dearborn, Mich., a corporation of Delaware Application September 16, 1953, Serial No. 380,432

2 Claims. (Cl. 56—364)

This invention relates to forage crop harvesting machines. In a more specific aspect this invention relates to a hay feeding and packing device for hay pickup attachments for forage crop harvesting machines.

One popular method for harvesting forage crops such as hay and the like comprises cutting the crop and subsequently raking said crop into windrows, where the crop is allowed to wilt and partially dry for a short period of time. A forage crop harvesting machine is then pulled through the field to pick up the windrow, chop the crop, and, by means of a blower, to forcibly eject the chopped crop into a trailed vehicle such as a wagon or truck. The processed crop is then transported to a silo or other suitable structure for storage. This method of harvesting provides appreciable economies of both time and effort as compared to the older methods of harvesting forage crops. However, due to the non-uniformity of windrows and feeding difficulties inherent in the construction of hay pickup attachments of forage harvesters, trouble has been encountered in feeding a crop through forage harvesters in a continuous and uninterrupted flow. For example, large clumps of hay in the windrows cause overloading of the forage harvester cutter and blower, and frequent plugging and stoppages of such machines have been common. Also a "dead space" exists between the tines of the hay pickup head and the front of the raddle conveyor of machines of conventional structure. At this "dead spot," hay picked up by the pickup head tends to build up into a pile and is not moved by the raddle conveyor to the rear of the machine in a uniform manner.

It is therefore an important object of the present invention to provide a novel hay feeding and packing device for use in hay pickup heads of forage crop harvesters.

It is another object of the present invention to provide a novel hay feeding and packing device for forage harvesters or the like which employs a continuous belt principle for effectively feeding and packing a fluffy crop to provide an even flow of such crop to the cutting head of forage harvesters.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a perspective view of the right side of a forage harvester with parts broken away in fragmentary detail to show the feeding and packing device of the present invention positioned over the raddle conveyor of the hay pickup attachment.

Figure 2 is an enlarged side view of the right hand side of the hay pickup attachment of a forage harvester with parts broken away in fragmentary detail to show the feeding and packing device of the present invention as it functions to uniformly feed and pack hay for conveyance to the cutter head.

Figure 3 is an enlarged side view of the left hand side of the hay pickup attachment of a forage harvester having the feeding and packing device of the present invention installed thereon and showing the arrangement of the power drive for said device.

Figure 4 is an enlarged section view taken along a plane 4—4 of Figure 3.

As shown on the drawings:

Figure 5:
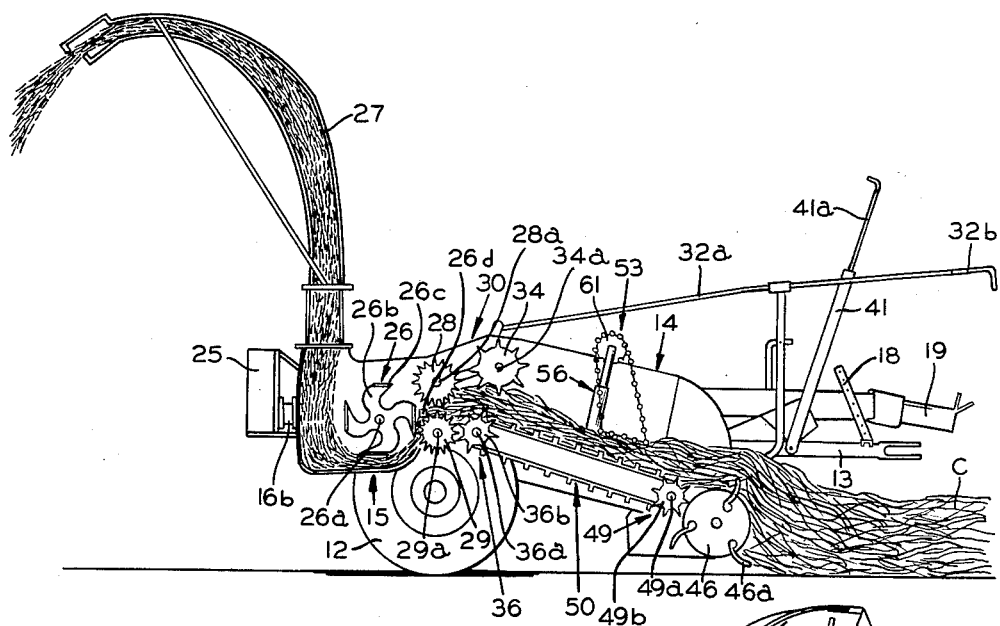
Figure 5 is a schematic view of the right hand side of a forage harvester showing the feeding and packing device of the present invention positioned over the raddle conveyor of the hay pickup attachment.

Reference numeral 10 relates generally to a forage crop harvesting machine having the feeding and packing device of the present invention installed thereon. The harvester 10 comprises a welded steel transverse main frame 11 which is supported on a pair of transversely spaced ground wheels 12 for transport. Attached to and projecting forwardly along the left side of the frame 11 is a tongue 13 which is adapted by means of a yoke 13a, formed at its forward end, to be attached to the draw bar of an agricultural-type tractor or other suitable towing vehicle.

Figure 6:
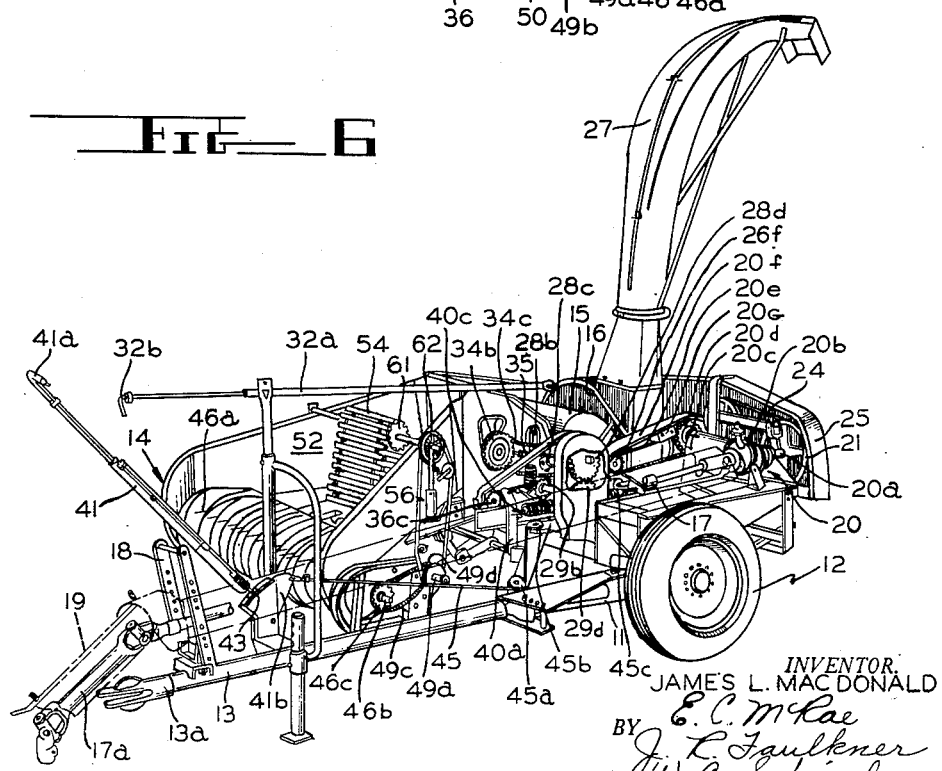
Figure 6 is a perspective view of the left hand side of a forage harvester having the hay feeding and packing mechanism of the present invention positioned over the raddle conveyor of the pickup attachment.

As shown in Figure 1, harvester 10 essentially comprises four main components, namely, the aforementioned frame 11 and ground wheels 12, a hay pickup attachment indicated by reference numeral 14, a reel-type cutter unit 15 and a blower 16, for forcibly ejecting the chopped crop into a trailed vehicle, such as a wagon, truck of the like. The working elements of forage harvester 10 are adapted to be driven from the power-take-off mechanism of the tractor which pulls it. Of course, it will be obvious to those skilled in the art that the machine can be fitted with its own power plant such as an internal combustion engine and a suitable gear reduction and clutch unit. As shown in Figure 6, a drive shaft 17 extends forwardly along the left hand side of frame 11 to the vicinity of the yoke 13a of tongue 13. Shaft 17 has a conventional universally jointed extensible shaft assembly 17a fastened to its forward end whereby it is adapted to be connected to the tractor's power take-off shaft. Shaft 17 is adjustably supported near its forward end by bracket 18, pivotally fixed to the top side of the forward end of tongue 13. A safety shield 19, fabricated of sheet metal, is supported over the drive shaft 17 by suitable bracing in a known manner.

The rear end of drive shaft 17 is connected to the main shaft 20a of a right angle drive unit 20, Figure 6, which is supported on frame 11 adjacent the left hand side of fan 16. The main shaft 20a of the right angle drive unit 20 is disposed longitudinally of frame 11 and protrudes through the rear end of the housing 20b of said right angle drive unit and has a V-pulley 21 mounted thereon. Right angle drive 20 also has a second power shaft 20c projecting outwardly from its housing at 90° to rearwardly projecting shaft 20a for a purpose to be later described. This second power shaft 20c is located on the right side of said right angle drive unit 20.

As shown in Figure 1, the blower 16 is mounted at the rear end of frame 11 and contains a multi-bladed fan 16a. Fan 16a is mounted on a shaft 16b which is disposed longitudinally of harvester 10 and projects rearwardly from the blower 16. An anti-friction bearing 22 is fixedly secured to frame 11, at the rear of blower 16, and rotatably journals shaft 16b of blower fan 16a. Shaft 16b has a V-pulley 23 affixed to its rearward end. Pulleys 21 and 23 are connected by means of a V-belt 24 to power the fan 16a. A suitable sheet metal safety shield 25 is placed around the pulleys 21 and 23 and belt 24.

As best shown in Figure 5, just ahead of the blower 16 there is provided a cutter unit 15 in which is rotatably mounted a reel type cutter head 26. This cutter head 26 is of conventional construction and for this reason, only a brief description will be given. The cutter head 26 comprises a shaft 26a upon which is mounted a pair of spiders 26b. These spiders 26b securely support a series of four curved knives 26c which are disposed generally transversely of harvester 10, as is shaft 26a. Shaft 26a is rotatably mounted in suitable anti-friction bearings secured to frame 11. A ledger plate 26d, comprising an elongated rectangular bar of steel is placed transversely of the machine adjacent the forward side of the periphery traversed by the knives 26c. The knives 26c shear past said ledger plate 26d to provide a cutting action. Cutter 15 abuts the blower housing 16 so that material chopped by the cutter 26 is directed into the blower fan 16a to be forcibly ejected out through the chute 27 to a trailed vehicle.

As shown in Figures 1 and 6, shaft 26a of cutter head 26 extends a short distance beyond the right and left sides of housing 15 and a pair of sprocket wheels 26e and 26f are respectively fastened to the right and left ends of said shaft. The auxiliary shaft 20c of the previously mentioned right angle drive unit 20 is fitted with a sprocket wheel 20d and such sprocket is connected to the sprocket 26f by means of a link chain 20e for powering cutter head 26. A sheet metal safety shield 20f is adjustably positioned over sprockets 20d and 26f to support an adjustable wood block chain tightener 20g. The sprocket wheel 26e, on the right hand end of shaft 26a, forms a part of a power train which drives a set of press rolls and the various moving parts of the hay pickup head located forwardly of the cutter unit 15.

A pair of vertically aligned feed rolls 28 and 29, Figure 5, are rotatably mounted transversely of the machine 10, immediately forward of the cutter 15, at the position indicated by the numeral 30, and are adapted to be powered from shaft 26a of cutter head 26 by a sprocket wheel 26e mounted on the right hand end of shaft 26a.

The lower feed roll 29 is mounted on a shaft 29a which has a gear 33, Figure 1, mounted on the right hand end thereof. This gear 33 is driven by reverse gear mechanism 31 of known configuration, located under the shield 31a. The reverse gear mechanism comprises a pair of meshed pinions 31b and 31c rotatably mounted in a shifter element 32. Pinion 31b is formed integrally with a sprocket wheel 31d. Sprocket wheels 31d and 26e are connected by means of a chain 31e. Pinions 31b and 31c are selectively engageable with gear 33 for driving roll 29 in a clockwise or counterclockwise direction as desired; a neutral position is also provided. A control handle assembly 32a, comprising a connecting lever and link assembly 32c, extends forwardly and terminates in a handle 32b adjacent the front end of the machine 10. Handle 32b is located in such a position that it is convenient to a tractor operator from the seat of the tractor, for adjustment of shifter element 32 to the position desired.

The shaft 29a of the lower feed roll 29 projects out of the left hand side of the feed roll housing and has a gear 29d, Figure 6, secured to its outer left end. This gear is one of a pair of vertically disposed gears rotated by axle 29a. The shaft which supports the upper of said pair of gears is connected to shaft 28a of the upper feed roll 28 by a universally jointed shaft 28c for driving said upper feed roll. The upper feed roll 28 is free to move vertically within the limits of vertical slots 28b formed in the supporting members in which the shaft 28a thereof is mounted. Roll 28 is thus adapted to float upon the crop being processed.

As shown in Figure 5, immediately forward of the vertically disposed feed rolls 28 and 29 is positioned a packer roll 34. Packer roll 34 is rotatably journaled on a pair of pivoted arms 35, Figures 3 and 6, which extend between the ends of shaft 28a of upper roll 28 and the corresponding ends of shaft 34a of the aforementioned packer roll 34. A pair of sprocket wheels 28e and 34b are respectively secured near the left hand ends of shafts 28a and 34a and are connected by means of a link chain 34c to power packer roll 34. By being supported on arms 35 in the manner described, the packer roll 34 is also adapted to float upon the crop being fed into the machine and moves up and down in response to variations in the feed.

A raddle conveyor drive 36 comprising a transverse shaft 36a rotatably mounted on anti-friction bearings secured to frame 11, and having a pair of sprocket wheels 36b, mounted on the median portion thereof, is located immediately forward of lower feed roll 29. The left end of shaft 36a of raddle conveyor drive 36 is fitted with a sprocket, 36c, Figure 6, and the left end of shaft 29a of lower feed roll 29 is also fitted with a sprocket 29b. These sprockets are connected by means of a chain for power transfer.

A pair of forwardly extending arms 37, Figure 2, are pivoted at their one ends near the respective ends of the aforementioned raddle conveyor drive shaft 36a and terminate in generally rectangular plates 38 which are adapted to be bolted to the frame members 39 of the hay pickup attachment 14.

A spring-loaded counterbalance mechanism is employed to provide a floating action for the hay pickup attachment 14 so that the front end of said unit can closely follow irregular ground contours as harvester 10 is moved through a field. The counterbalance mechanism comprises a pair of spring-loaded bell crank and connecting link units 40, best shown in Figures 1 and 2. The bell cranks 40a are pivotally mounted on a transverse shaft 40d, journaled in a pair of bearings bolted beneath frame members 11. Bell cranks 40a have their lower forward ends pivotally connected to frame members 39 of hay pickup attachment 14 by links 40b. The upper ends of bell cranks 40a are connected to heavy tension springs 40c, Figures 2 and 6, which are adjustably anchored to the rearward end of harvester frame 11 and provide an upward bias for pickup attachment 14.

As shown in Figures 1 and 6, an upstanding lever 41 is pivotally secured at its lower end to a bracket 42, welded near the forward end of tongue 13. Lever 41 terminates at its upper end in a handle portion 41a. Lever 41 is adapted to coact with a sector indicated at 43 in a known manner, for positioning as desired. A plate 41b is welded to the lower end of lever 41 and a cable 45 is connected between the rear end of said plate and an arm 40a of the counterbalance mechanism. Cable 45 is reeved over a series of three pulleys 45a, 45b and 45c, Figure 6, to approach lever 40a from the rear of the machine. When lever 41 is moved forward or backward, the front end of the hay pickup attachment 14 is moved up or down in relation to the surface of the ground and can thus be adjusted for most advantageous and effective crop pick up.

The hay pickup attachment 14 is comprised of a welded steel frame 39 having a rotary hay pickup reel 46 of commercial construction mounted transversely at the forward end of said frame 39. A bracket member 47 is secured to each side of the front end of frame 39 and a pair of forwardly and upwardly curved runners 48 are attached to said brackets. Runners 48 serve to maintain the tines 46a of the pickup reel 46 a desired distance above the ground. A raddle conveyor idler assembly 49, Figure 5, is disposed transversely of frame 39 just behind the hay pickup reel 46. Raddle conveyor idler assembly 49 comprises a shaft 49a rotatably journaled in anti-friction bearings secured to frame 39 and has a pair of sprocket wheels 49b mounted on the median portion thereof in longitudinal alignment with sprocket wheels 36b of raddle conveyor drive 36. A raddle conveyor 50 of the continuous belt type, having transversely disposed angle iron flights 50a, Figure 4, connected to a pair of continuous chains 50b, runs over the idler assembly 49 and the driving assembly 36. The left end of shaft 46b of the hay pickup reel 46 and the left end of shaft 49a of the raddle conveyor idler assembly 49 are respectively fitted with sprocket wheels 46c and 49d, Figure 6. A chain 49c connects the sprockets 46c and 49d for powering the hay pickup reel 46.

The raddle conveyor 50 moves over an apron 51, Figure 4, and a pair of upstanding sides 52 are secured along the edges of said apron to retain the picked up crop on said apron and funnel said crop to the feed rolls and cutter previously mentioned. Sides 52 are suitably fabricated of sheet metal and are welded or riveted to the edges of apron 51. A longitudinally disposed guide portion 51b retains raddle conveyor 50 in the central portion of apron 51. Guide portion 51b comprises a pair of transversely spaced channel iron guide members 51c in which a pair of continuous chains 50b of conveyor 50 are carried. The space between the channel guides 51c and apron floor 51 is bridged with wood planks 51e, or metal plates. Raddle conveyor 50 travels toward the rear of the machine as the same advances into a windrowed crop, and in combination with the pickup head 46, transports the crop to the packer roll 34 and the feed rolls 28 and 29, thence to the cutter 26, etc.

The above description illustrates in a general way the configuration of a forage harvester on which the novel feeding and packing mechanism of the present invention can be used and such feeding and packing mechanism will now be described in complete detail. The present feeding and packing mechanism is indicated by reference numeral 53 and such mechanism comprises a series of rods 54 fabricated of wood, steel or other suitable material, which are respectively fastened at each of their ends to a pair of continuous link chains 55. Rods 54 are spaced adjacent each other along said chains 55 to form a continuous belt.

As shown in Figure 4 a pair of upstanding supports 56 are secured to the apron brackets 51a and are disposed outboard of the sides 52. Said supports 56 are comprised of base flanges 57 into which are rigidly secured base tubes 58. A pair of upper tubes 59 are adapted to telescope within the base tubes 58. Tubes 58 are provided near their upper ends with a pair of transverse holes 58a which are adapted to mate with a series of holes 59b provided in tubes 59. A pin or bolt is passed through a set of the aforementioned holes 58a and 59b to position shaft 60 at an operable height above raddle conveyor 50 and apron 51. Tubes 59 are provided at their upper ends with antifriction bearings 59a and a shaft 60 is rotatably journaled in said bearing and is disposed transversely of the hay pickup attachment 14. A pair of laterally spaced sprocket wheels 61, Figures 2 and 4, are secured on shaft 60 and chains 55 are trained over said sprockets to support the feeding and packing unit 53. As shown in Figures 3 and 4, shaft 60 is fitted with a V-pulley 62 which abuts the inside of the left hand bearing 59a. This pulley 62 and a shaft collar 63, which abuts the inside of the right hand bearing 59a, Figure 4, serve to prevent endwise movement of shaft 60.

The shaft 49a of the raddle conveyor idler assembly 49 is also fitted at a V-pulley 64. A belt tightener assembly 65 is secured to the apron sides 52 generally below pulley 62. Tightener assembly 65 comprises an arm 65a, pivotally secured at one end to apron side 52, and has a small idler pulley 65b rotatably journaled on its free end. A coil spring 65c is attached at its one end to a median point of arm 65a and at its other end to apron side 52. A V-belt 66 is wrapped in a reversing manner about V-pulleys 62, 64 and tightener pulley 65b to power the feeding and packing unit 53.

As shown in Figure 3 by the relative sizes of pulleys 64 and 62, the linear speed of bars 54 of the feeding and packing unit 53 is designed to be slightly greater than the linear speed of the flights 50a of the raddle conveyor 50. By running the feeding and packing mechanism 53 slightly faster than raddle conveyor 50, bars 54 of said feeding and packing mechanism will be caused to crawl forward and will pull the crop C onto the raddle conveyor from the aforementioned dead spot D which exists between the periphery of the pickup tines 46a and the forward periphery of the raddle conveyor flights 50a. This crawling action of feeder 53 will also tend to level out clumps of hay picked up from uneven windrows. Thus the present feeding and packing unit 53 coacts with raddle conveyor 50 to provide a constant and uniform feed of the picked up crop to the various components located on the rear portion of harvester 10.

In summary, the general operation of the harvester 10 having the present feeding and packing mechanism 53 employed thereon is as follows:

Power is transmitted to the machine and its various components from a tractor power take-off shaft (not shown) via shaft 17. The power enters a right angle drive unit 20 and thence is transmitted to blower 16 and cutter 15 by separate drives to each unit. The power to cutter 15 is further transmitted by a chain drive to feed rolls 29 and 28 and packer roll 34. From feed roll 29 the power flows to the raddle conveyor 50 and is transmitted from the front end of said raddle conveyor via chain 49c to the hay pickup attachment 14, and by belt 66 to the present feeding and packing unit 53. Thus it can be readily understood that power flows in a continuous manner from cutter 15 forwardly from one component of the machine to the next without duplicating drives. With the gears of the machine set for forward motion and with power supplied to shaft 17 the hay pickup reel 46 is rotated in a counterclockwise direction and tines 46a pick up hay from a windrow and move it onto apron 51. At this point the rods 54 of the hay feeding and packing unit 53 are moving forward to pull the hay rearwardly onto the raddle conveyor 50. At this point the rods 54 tend to smooth out the flow by leveling clumps of hay which may have been picked up from irregular windrows. Thus a constant and uniform feed of material is moved onto the raddle conveyor 50. The crop is carried rearwardly on raddle conveyor 50 and passes beneath packer roll 34 where it is compressed slightly and thence feeds in the form of a belt like strip between feed rolls 28 and 29. Rolls 28 and 29 exert a further compressing action upon the crop and continue to feed it rearwardly across the ledger plate 26d where it is cut into short lengths by the rapidly whirling knives 26c of cutter head 26. As previously mentioned, the housing of cutter 15 abuts blower housing 16 and opens into said blower. The chopped crop is thus fed into blower 16 where the fan 16a forcibly ejects said crop out through the discharge chute 27 and thence into a trailed vehicle.

It will be obvious from the foregoing description that the present invention provides an improved and novel feeding and packing device for hay pickup attachments of forage harvesters. By means of the present novel feeding and packing device, an even and constant flow of hay is provided in forage harvesters, thus enabling a farmer to more efficiently process his forage crops by reducing stoppages and plugging of forage harvesters, as has been common in the past.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a machine for harvesting forage comprising a mobile frame, an endless conveyor supported on the frame and extending lengthwise thereof, said conveyor angling upwardly from a point adjacent the forward end of the frame to a point adjacent the rear end thereof, said machine having a pickup head rotatably supported on the low forward end of the frame and extending transversely thereof, and having circumferentially spaced pickup tines operative to pick cut-off forage from the ground and deposit it on the low forward end of the endless conveyor, an ensilage cutter supported on the frame and adapted to receive the forage discharged from the high rear end of the endless conveyor; the improvement of a forage feeding and packing mechanism, said mechanism comprising a continuous belt, formed from a pair of continuous chains of equal length and having a series of parallel rods respectively connected near their ends to said chains, a shaft rotatably supported above and disposed transversely of said endless conveyor, a pair of sprocket wheels secured at laterally spaced points on said shaft and adapted to operatively receive said chains and pendantly support said endless belt above the forward portion of said endless conveyor, means for adjusting the vertical position of said endless belt above said endless conveyor, and means for driving said crop feeding and packing mechanism in a direction and at a speed whereby it pulls the gathered crop from said pickup head onto said endless conveyor.

2. In a machine for harvesting forage comprising a mobile frame, an endless conveyor supported on the frame and extending lengthwise thereof, said conveyor angling upwardly from a point adjacent the forward end of the frame to a point adjacent the rear end thereof, said machine having a pickup head rotatably supported on the low forward end of the frame and extending transversely thereof, and having circumferentially spaced pickup tines operative to pick cut-off forage from the ground and deposit it on the low forward end of the endless conveyor, an ensilage cutter supported on the frame and adapted to receive the forage discharged from the high rear end of the endless conveyor; the improvement of a forage feeding and packing mechanism, said mechanism comprising a continuous belt, formed from a pair of continuous chains of equal length and having a series of parallel rods respectively connected near their ends to said chains, a pair of upstanding brackets of adjustable length, respectively disposed adjacent the outer sides of said endless conveyor and having antifriction bearings secured to their upper ends, a shaft rotatably journaled in said bearings and having a pair of sprocket wheels secured on a median portion thereof, said sprocket wheels being adapted to receive said chains and pendantly support said endless belt above the forward portion of said endless conveyor, and means for driving said endless belt in a direction and at a speed in excess of the speed of said conveyor whereby a depending portion of said belt is disposed to float on the forage carried by said endless conveyor and pull the gathered forage from said pickup onto said conveyor in a continuous and even manner.

No references cited.